United States Patent [19]

Wong

[11] Patent Number: 5,476,200

[45] Date of Patent: Dec. 19, 1995

[54] PICK-UP TRUCK BICYCLE RACK

[76] Inventor: Gene L. Wong, 241 N. Third Ave., Villa Park, Ill. 60181

[21] Appl. No.: 223,041

[22] Filed: Apr. 5, 1994

[51] Int. Cl.[6] .................................................. B60R 9/00
[52] U.S. Cl. ..................... 224/405; 224/42.32; 224/539; 224/568; 224/924
[58] Field of Search ................. 224/42.42, 42.45 R, 224/42.03 B, 42.32, 42.33, 42.34, 42.43, 42.44; 410/3

[56] References Cited

U.S. PATENT DOCUMENTS

| | | | |
|---|---|---|---|
| 930,410 | 8/1909 | Noonan | 224/42.44 |
| 2,660,452 | 11/1953 | Johnson, Jr. | 224/42.43 |
| 3,240,406 | 3/1966 | Logan | 224/42.03 B |
| 3,901,421 | 8/1975 | Kalicki et al. | 224/42.03 B |
| 3,912,139 | 10/1975 | Bowman | 410/3 |
| 4,702,401 | 10/1987 | Graber et al. | 224/42.03 B |

Primary Examiner—Linda J. Sholl

[57] ABSTRACT

A rack positionable within a bed of a pick-up truck for supporting a plurality of bicycles in a parallel, spaced relationship. The rack includes a pair of transverse members positionable against opposed front and rear sides of wheel wells within the truck bed. A plurality of bicycle wheel receiving channels extend orthogonally over the transverse members to support a bicycle within each one of the channels. Each channel is provided with a vertically extending upright member which attaches to the bicycle to support the same in a vertical orientation. Because the transverse members engage front and rear sides of the wheel wells, no additional mounting means is needed to preclude movement of the rack within the truck bed.

3 Claims, 5 Drawing Sheets

PICK-UP TRUCK BICYCLE RACK

BACKGROUND OF THE INVENTION

1. Field of the Invention

The present invention relates to bicycle carriers and more particularly pertains to a pick-up truck bicycle rack positionable within the bed of a pick-up truck for supporting a plurality of bicycles in a parallel, spaced relationship.

2. Description of the Prior Art

The use of bicycle carriers is known in the prior art. More specifically, bicycle carriers heretofore devised and utilized for the purpose of removably attaching at least one bicycle to a vehicle are known to consist basically of familiar, expected and obvious structural configurations, notwithstanding the myriad of designs encompassed by the crowded prior art which have been developed for the fulfillment of countless objectives and requirements.

For example, a removable vehicle cycle carrier is illustrated in U.S. Pat. No. 3,912,139 which is arranged for mounting upon the flat bed of a truck, trailer or van. The device includes a pair of upwardly opening channel-shaped members coupled to a plurality of transversely extending runners which support the channels on the bed and engage the truck side walls to secure the channels in place.

Another patent of interest is U.S. Pat. No. 5,092,504 which teaches a bicycle rack for a pick-up truck which includes an extendible longitudinal bar on which mounting brackets are provided for mounting one or more bicycles, as well as detached front bicycle wheels. The bicycles may be attached to the device by removing the front wheel of the bicycle and attaching the front fork of the bicycle to the rack.

Other known bicycle carrying devices include U.S. Pat. Nos. 5,037,019; 5,040,710; and 5,127,564.

While these devices fulfill their respective, particular objectives and requirements, the aforementioned patents do not disclose a pick-up truck bicycle rack positionable within a bed of a pick-up truck for supporting a plurality of bicycles in a parallel, spaced relationship which includes a pair of transverse members positionable against opposed front and rear sides of wheel wells within the truck bed with a plurality of bicycle wheel receiving channels extending orthogonally over the transverse members to support a bicycle within each one of the channels, wherein the transverse members engage the front and rear sides of the wheels wells to preclude movement of the rack within the truck bed. Further, none of the known prior art bicycle carriers teach or suggest a pick-up truck bicycle rack of the aforementioned structure which further includes a vertically extending upright member pivotally mounted to each of the channels which attaches to the bicycle to support the same in a vertical orientation.

In these respects, the pick-up truck bicycle rack according to the present invention substantially departs from the conventional concepts and designs of the prior art, and in so doing provides an apparatus primarily developed for the purpose of supporting a plurality of bicycles in a parallel, spaced relationship within a pick-up truck bed.

SUMMARY OF THE INVENTION

In view of the foregoing disadvantages inherent in the known types of bicycle carriers now present in the prior art, the present invention provides a new pick-up truck bicycle rack construction wherein the same can be utilized for supporting a plurality of bicycles in a parallel, spaced relationship within a truck bed. As such, the general purpose of the present invention, which will be described subsequently in greater detail, is to provide a new pick-up truck bicycle rack apparatus and method which has many of the advantages of the bicycle carriers mentioned heretofore and many novel features that result in a pick-up truck bicycle rack which is not anticipated, rendered obvious, suggested, or even implied by any of the prior art bicycle carriers, either alone or in any combination thereof.

To attain this, the present invention generally comprises a rack positionable within a bed of a pick-up truck for supporting a plurality of bicycles in a parallel, spaced relationship. The rack includes a pair of transverse members positionable against opposed front and rear sides of wheel wells within the truck bed. A plurality of bicycle wheel receiving channels extend orthogonally over the transverse members to support a bicycle within each one of the channels. Each channel is provided with a vertically extending upright member which attaches to the bicycle to support the same in a vertical orientation. Because the transverse members engage front and rear sides of the wheel wells, no additional mounting means is needed to preclude movement of the rack within the truck bed.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pick-up truck bicycle rack apparatus and method which has many of the advantages of the bicycle carriers mentioned heretofore and many novel features that result in a pick-up truck bicycle rack which is not anticipated, rendered obvious, suggested, or even implied by any of the prior art bicycle carriers, either alone or in any combination thereof.

It is another object of the present invention to provide a new pick-up truck bicycle rack which may be easily and efficiently manufactured and marketed.

It is a further object of the present invention to provide a new pick-up truck bicycle rack which is of a durable and reliable construction.

An even further object of the present invention is to provide a new pick-up truck bicycle rack which is susceptible of a low cost of manufacture with regard to both materials and labor, and which accordingly is then susceptible of low prices of sale to the consuming public, thereby making such pick-up truck bicycle racks economically available to the buying public.

Still yet another object of the present invention is to provide a new pick-up truck bicycle rack which provides in the apparatuses and methods of the prior art some of the advantages thereof, while simultaneously overcoming some of the disadvantages normally associated therewith.

Still another object of the present invention is to provide a new pick-up truck bicycle rack which may be positioned within a bed of a pick-up truck for supporting a plurality of bicycles in a parallel, spaced relationship.

Yet another object of the present invention is to provide a new pick-up truck bicycle rack which includes a pair of transverse members positionable against opposed front and rear sides of wheel wells within the truck bed, and a plurality of bicycle wheel receiving channels extending orthogonally over the transverse members to support a bicycle within each one of the channels, whereby the transverse members engage front and rear sides of the wheel wells to preclude movement of the rack within the truck bed.

Even still another object of the present invention is to provide a new pick-up truck bicycle rack of the aforementioned structure which further includes a plurality of vertically extending upright members pivotally mounted to the channels and attachable to the bicycles to support the same in a vertical orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
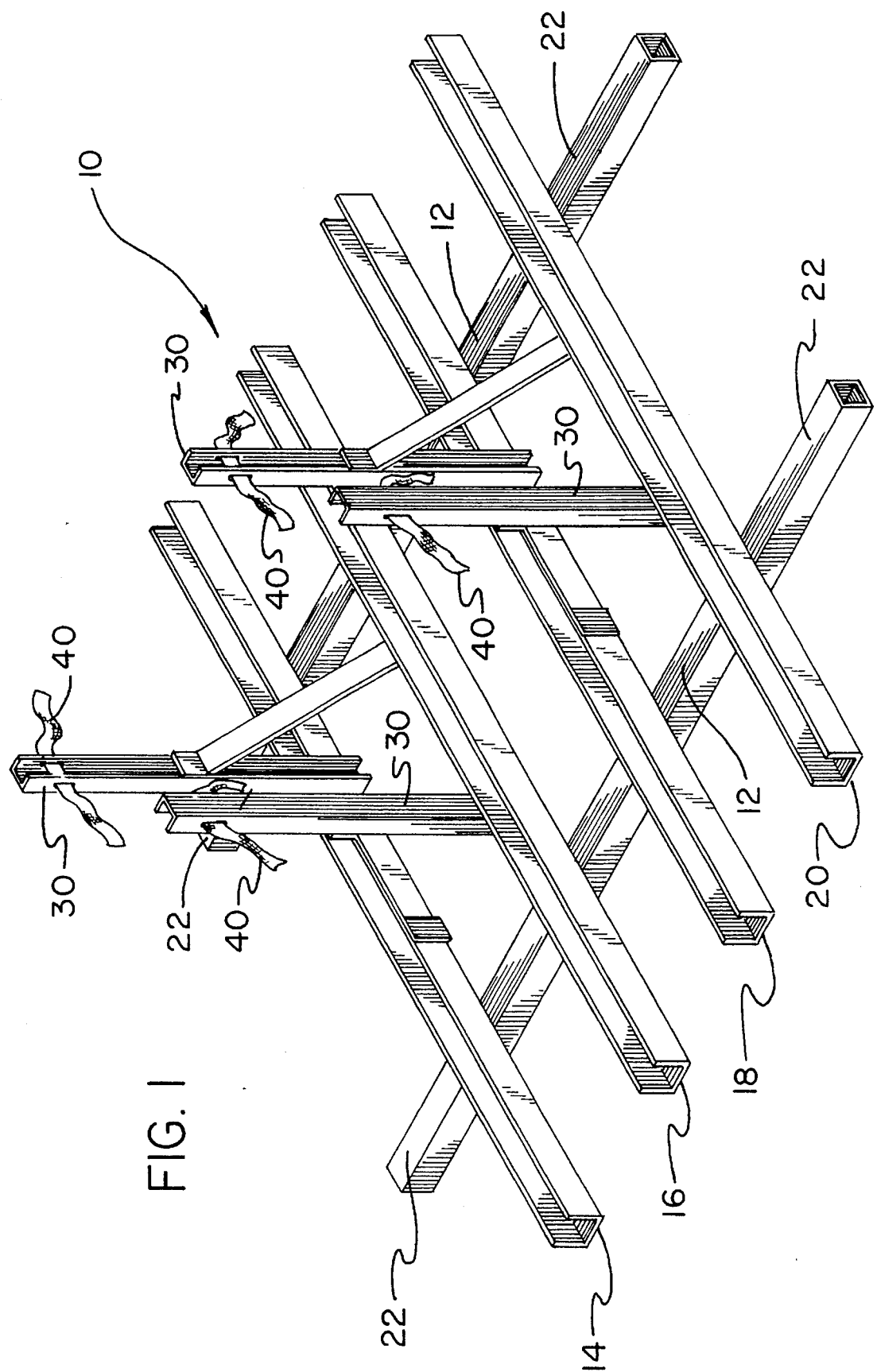
FIG. 1 is an isometric illustration of a pick-up truck bicycle rack comprising the present invention.

With reference now to the drawings, and in particular to FIGS. 1–8 thereof, a new pick-up truck bicycle rack embodying the principles and concepts of the present invention and generally designated by the reference numeral 10 will be described.

More specifically, it will be noted that the pick-up truck bicycle rack 10 comprises a pair of transverse members 12 dimensioned to fit between the side walls of an associated, unillustrated pick-up truck. A plurality of wheel channels 14–20 are coupled to upper surfaces of the transverse members 12 and extend orthogonally over in a substantially spaced, parallel relationship to one another. The channels 14–20 include a first wheel channel 14, a second wheel channel 16, a third wheel channel 18, and a fourth wheel channel 20, with the first and fourth wheel channels being spaced from the ends of the transverse members 12 so as to define outer anchor portions 22 of the transverse members 12. The outer anchor portions 22 are operable to be positioned against the front and rear sides of a wheel well within the pick-up truck bed to preclude a movement of the rack 10 within the bed.

Figure 3:
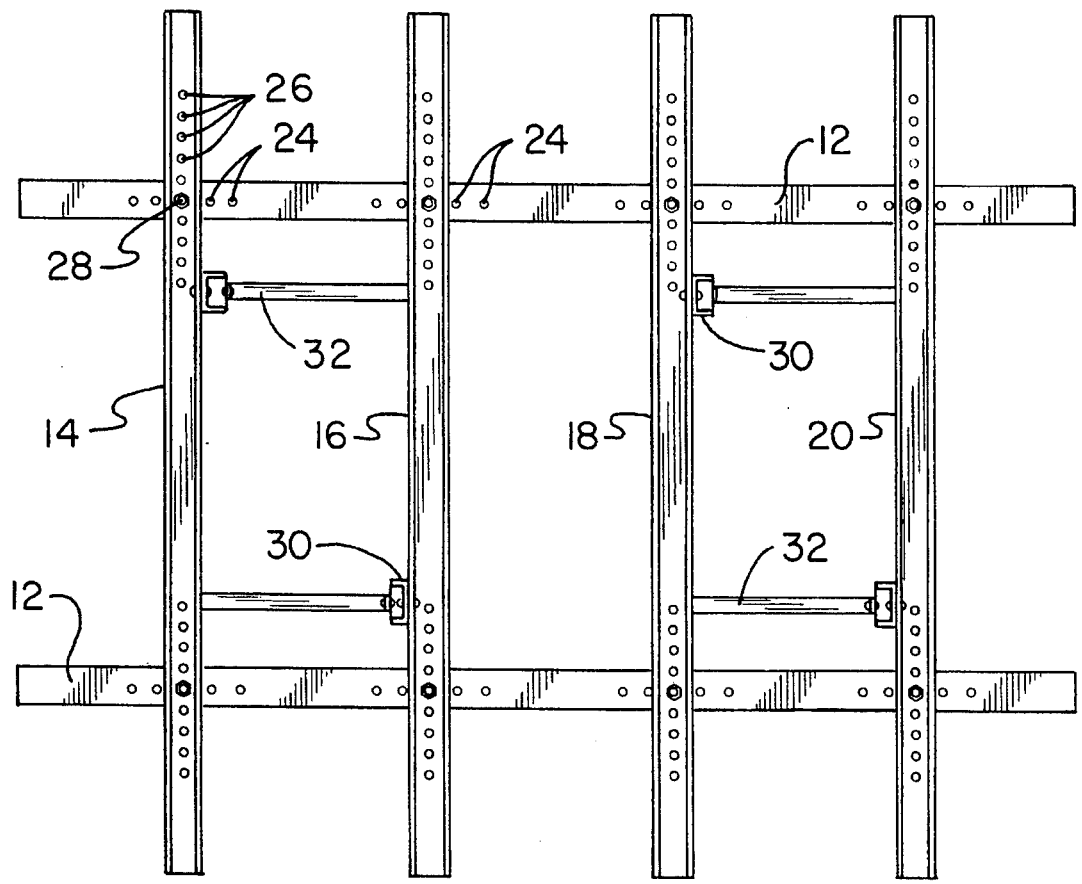
FIG. 3 is a top plan view of the invention.
Figure 7:
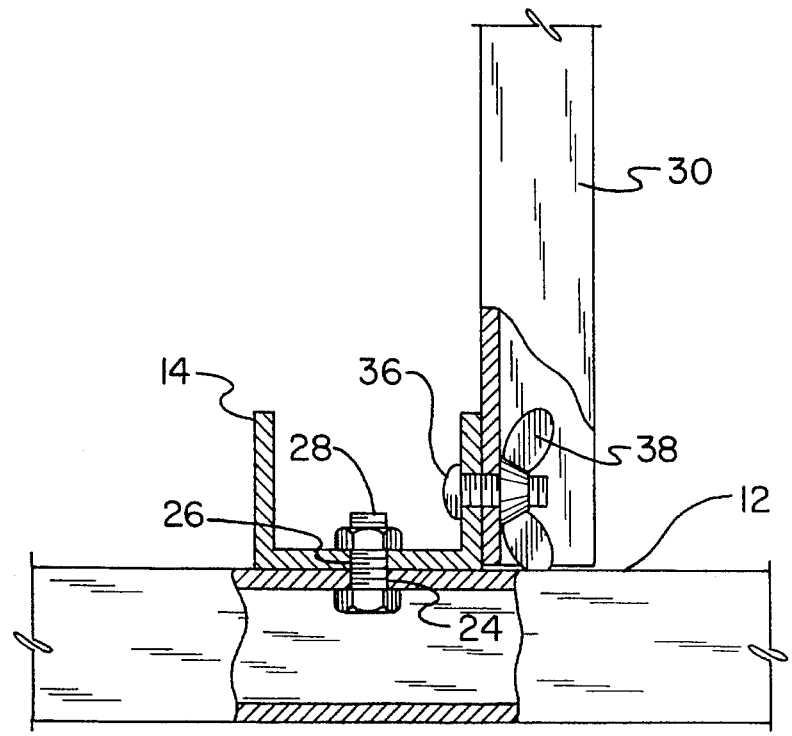
FIG. 7 is an enlarged rear elevation view, partially in cross section, of a portion of the present invention.

As best illustrated in FIG. 3, the transverse members 12 are each provided with a plurality of transverse member apertures 24 which allow the outermost channels 14, 20 to be laterally positioned into abutting relation against the inner lateral edges of the unillustrated wheel wells of the pick-up truck bed, thereby precluding lateral movement of the rack within the pick-up truck bed while simultaneously allowing for adjustment of the rack to accommodate various widths of pick-up trucks. In addition, each of the channels 14–20 is provided with a plurality of channel apertures 26 which permit fore and aft adjustment of the transverse members 12, thus allowing the transverse members to be adjusted into abutting relation with the fore and aft sides of the wheel wells, whereby such position may be secured and retained by a bolt 28 which passes through both one of the channel apertures 26 and one of the transverse member apertures 24, as best illustrated in FIG. 7. By this structure, no additional mounting means is required to secure the rack 10 within the bed of a pick-up truck, although additional securing means may also be employed to preclude theft and the like.

Figure 2:
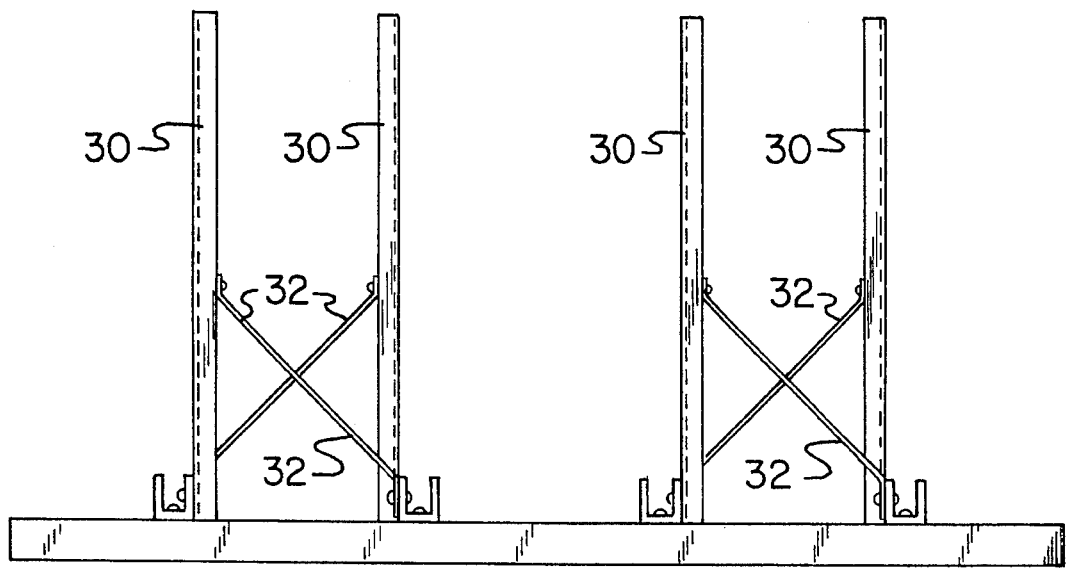
FIG. 2 is a rear elevation view of the present invention.
Figure 4:
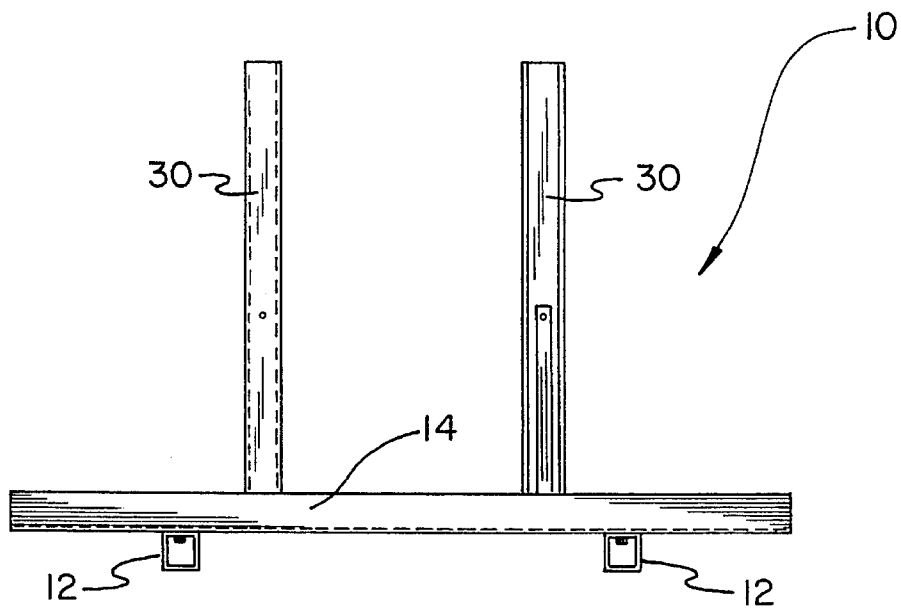
FIG. 4 is a side elevation view of the invention in an erected form.
Figure 5:
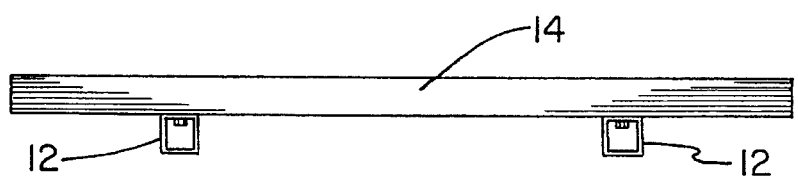
FIG. 5 is a further side elevation view of the invention in a folded form.
Figure 6:
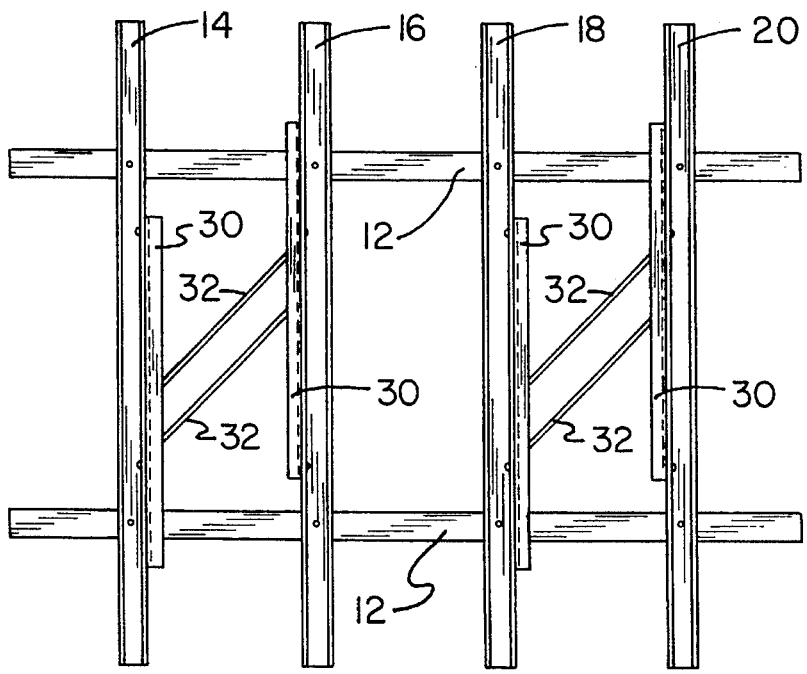
FIG. 6 is a further top plan view of the invention folded.
Figure 8:
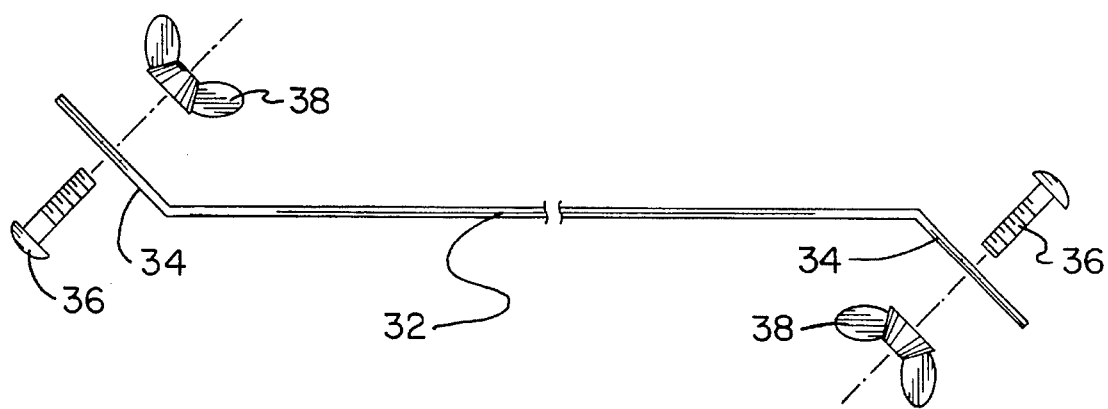
FIG. 8 is an orthographic view of a brace comprising a portion of the present invention.
Figure 9:
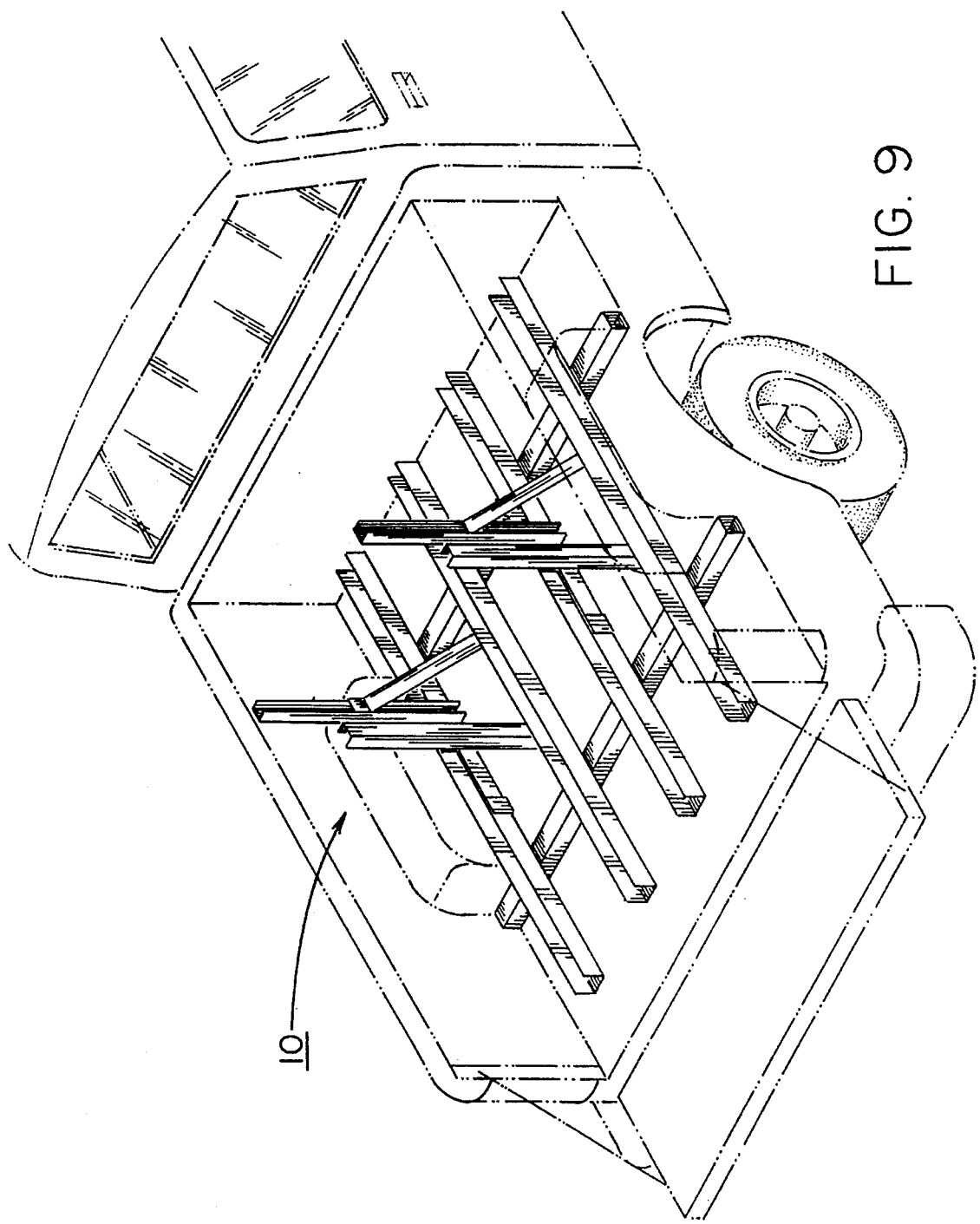
FIG. 9 is a perspective illustration of the present invention mounted in the bed of a truck shown in dotted line configuration.

The wheel channels 14–20 are substantially C-shaped and arranged so as to be upwardly facing to receive a portion of a bicycle wheel between the spaced side walls of each channel. To support each bicycle within a respective channel 14–20 in a vertical orientation, an upright member 30 is pivotally coupled to each of the channels, as illustrated in FIGS. 2 and 4. The upright members 30 are each further supported by a brace 32 which extends from the upright member to an adjacent wheel channel 14–20. The brace 32, as illustrated in FIG. 8, includes a pair of parallel, offset portions 34 through which a threaded fastener 36 projects into engagement with a removable wing nut 38 to secure the brace to the upright member and the adjacent channel. As best illustrated in FIG. 7, the upright members 30 are connected to the channels by a similar threaded fastener 36 and wing nut 38, whereby the braces 32 may be decoupled from either the associated upright member or the associated channel such that the braces 32 and the upright members 30 may be compactly folded as illustrated in FIGS. 5 and 6.

Referring now to FIG. 1, it can be shown that each of the upright members 30 is provided with a pair of slots which allow for the through-extending passage of a retaining strap 40 for engagement to the frame, handlebars, or other portion of the associated bicycle. Each of the retaining straps 40 comprises a web having cooperating fabric fasteners secured at respectively opposed ends thereof, with such fabric fasteners comprising snaps, buttons, or the like, with the fabric fasteners preferably comprising the releasable hook and loop material commonly known as Velcro. Alternatively, the retaining straps 40 may simply be tied together around a portion of the bicycle. In addition, it is contemplated that each of the retaining straps 40 may comprise a lockable cable, whereby bicycles or the like stored within the rack 10 may be protected against theft or the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new pick-up truck bicycle rack for supporting a bicycle within a pick-up truck bed having side walls, said rack comprising:

a pair of transverse members for placement between said side walls of said pick-up truck bed, said transverse members each having an upper surface and a pair of ends;

a plurality of spaced, parallel wheel channels being adjustably coupled to said upper surfaces of said transverse members and extending orthogonally over said transverse members, said plurality of wheel channels including a pair of outermost channels, with said outermost channels being spaced from said ends of said transverse members so as to define outer anchor portions of said transverse members operable to be positioned against front and rear sides of a wheel well within said pick-up truck bed to preclude a movement of said rack within said bed, each of said transverse members is provided with a plurality of transverse member apertures, and each of said channels is provided with a plurality of channel apertures, and further comprising a plurality of fasteners, with one of said fasteners passing through both an individual one of said plurality of transverse member apertures and an individual one of said plurality of channel apertures to secure said channels to said transverse members, thereby permitting fore and aft adjustment of said transverse members relative to said channels to allow said transverse members to be adjusted into abutting relation with said wheel wells;

a plurality of upright members, each of said upright members being pivotally coupled to an individual one of said channels, and a plurality of retaining straps, each of said retaining straps being coupled to an individual one of said upright members for engagement to a portion of said bicycle;

a plurality of braces, each of said braces extending from an individual one of said upright members to an individual, adjacent wheel channel.

2. The new pick-up truck bicycle rack of claim 1, wherein each of said retaining straps comprises a web having ends with cooperating fabric fasteners secured at said ends thereof.

3. The new pick-up truck bicycle rack of claim 2, wherein said plurality of channels comprises four channels.

* * * * *